Shipley & Moody,
Horse-Collar Fastener.
No. 69,712.   Patented Oct. 8, 1867.
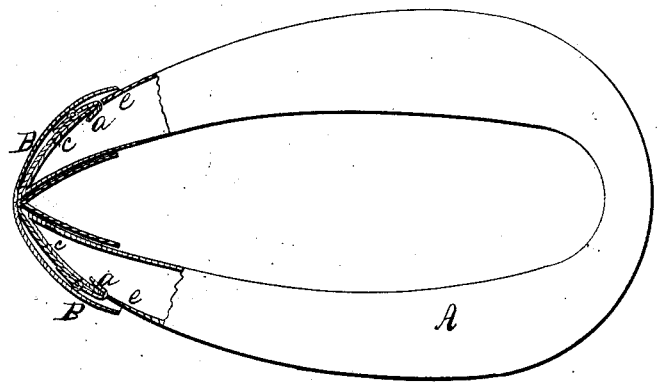
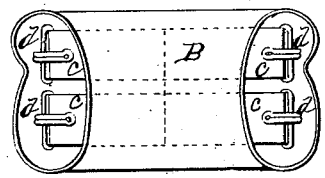
Witnesses.
Theo Finocke
Wm Treurn
Inventor.
T. J. Shipley
W. Moody
Per Munn & Co.
Attorneys

United States Patent Office.

T. J. SHIPLEY AND W. A. MOODY, OF MONTEZUMA, IOWA.

Letters Patent No. 69,712, dated October 8, 1867.

IMPROVEMENT IN HORSE-COLLARS.

*The Schedule referred to in these Letters Patent and making part of the same.*

TO ALL WHOM IT MAY CONCERN:

Be it known that we, T. J. SHIPLEY and W. A. MOODY, of Montezuma, in the county of Poweshiek, and State of Iowa, have invented a new and useful Improvement in Horse-Collars; and we do hereby declare that the following is a full, clear, and exact description thereof, which will enable others skilled in the art to make and use the same, reference being had to the accompanying drawings forming part of this specification.

This invention relates to an improvement in horse-collars, and consists in a rubber spring adjusted in a hollow pad or shoe, and attached to the sides of the collar, which is disconnected at bottom by hooks screwing into the walls of the collar. In the accompanying drawings—

Figure 1 is an end view of our improved horse-collar, with part broken away to show our improvement in section, and Figure 2 a top view of the connecting spring as inserted in its shoe.

Similar letters of reference indicate like parts.

A is the collar; B, the shoe or hollow pad, in which the India-rubber springs C are secured, having hooks $d$ at their ends to attach in hole $e$ in the wall of the collar A.

We claim as new, and desire to secure by Letters Patent -

The hollow pad B, fitting over and securing the ends of horse-collars, said pad having upon its inside the longitudinal rubber springs C, which springs fit over the ends of the collar, and are secured to the outside of the walls in holes $e$ by means of the hooks $d$, as herein shown and described.

T. J. SHIPLEY,
W. A. MOODY.

Witnesses:
R. W. LATCHEM,
WILLIAM MOODY.